US012716999B2

(12) United States Patent
Bogatscher et al.

(10) Patent No.: US 12,716,999 B2
(45) Date of Patent: Aug. 25, 2026

(54) METHOD FOR ASCERTAINING AN OPTICAL CROSSTALK OF A LIDAR SENSOR AND LIDAR SENSOR

(71) Applicant: Robert Bosch GmbH, Stuttgart (DE)

(72) Inventors: Siegwart Bogatscher, Leonberg (DE); Alexander Greiner, Reichenbach (DE); Gerald Franz, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 786 days.

(21) Appl. No.: 17/923,336

(22) PCT Filed: Jul. 19, 2021

(86) PCT No.: PCT/EP2021/070084
§ 371 (c)(1),
(2) Date: Nov. 4, 2022

(87) PCT Pub. No.: WO2022/028864
PCT Pub. Date: Feb. 10, 2022

(65) Prior Publication Data

US 2023/0194665 A1 Jun. 22, 2023

(30) Foreign Application Priority Data

Aug. 5, 2020 (DE) ..................... 10 2020 209 849.2

(51) Int. Cl.
*G01C 3/08* (2006.01)
*G01S 7/48* (2006.01)
*G01S 17/89* (2020.01)

(52) U.S. Cl.
CPC ............ *G01S 7/4802* (2013.01); *G01S 17/89* (2013.01)

(58) Field of Classification Search
CPC ............................... G01S 7/4802; G01S 17/89
See application file for complete search history.

(56) References Cited

U.S. PATENT DOCUMENTS

2013/0293684 A1 11/2013 Becker et al.
2021/0033711 A1* 2/2021 Helsloot ............... G01S 7/4817
(Continued)

FOREIGN PATENT DOCUMENTS

CN 101357066 A 2/2009
CN 108693515 A 10/2018
(Continued)

OTHER PUBLICATIONS

International Search Report for PCT/EP2021/070084, Issued Oct. 29, 2021.

*Primary Examiner* — Mark Hellner
(74) *Attorney, Agent, or Firm* — NORTON ROSE FULBRIGHT US LLP

(57) ABSTRACT

A method for ascertaining an optical crosstalk of a lidar sensor. The method includes: emitting a laser light of the lidar sensor, receiving a signal of a light detector of the lidar sensor representing components of the laser light reflected or scattered. The light detector has a first receive region, the extension and position of which on the light detector corresponds to an extension and position of the laser light imaged onto the light detector when a scattering of the laser light is equal to or less than a predefined threshold value. The light detector has a second receive region directly adjoining the first receive region and which detects components of the laser light imaged onto the light detector when the scattering of the laser light is greater than the predefined threshold value.

11 Claims, 2 Drawing Sheets

(56) References Cited

U.S. PATENT DOCUMENTS

| | | | | |
|---|---|---|---|---|
| 2021/0223374 | A1* | 7/2021 | Kudla | G01S 17/42 |
| 2022/0308232 | A1* | 9/2022 | Sun | G01S 7/4808 |
| 2023/0035528 | A1* | 2/2023 | Ma | G01S 17/931 |

FOREIGN PATENT DOCUMENTS

| | | | |
|---|---|---|---|
| CN | 111366941 | A | 7/2020 |
| CN | 111398935 | A | 7/2020 |
| DE | 102012025467 | A1 | 7/2014 |
| DE | 102015101902 | A1 | 8/2016 |
| EP | 2998700 | B1 | 12/2016 |
| JP | 2015190771 | A | 11/2015 |
| JP | 2018159628 | A | 10/2018 |
| JP | 2020501109 | A | 1/2020 |

* cited by examiner 40 55 20
50
30 35

METHOD FOR ASCERTAINING AN OPTICAL CROSSTALK OF A LIDAR SENSOR AND LIDAR SENSOR

FIELD

The present invention relates to a method for ascertaining an optical crosstalk of a lidar sensor, in particular of a spatially resolving lidar sensor, and to such a lidar sensor.

BACKGROUND INFORMATION

Lidar sensors of various forms are available in the related art, which are used in particular in partially automated or even highly automated vehicles for detecting the surroundings. Depending on the technology used, crosstalk of varying intensity may occur in the receive path of the lidar sensors (e.g. due to scattering of a received light on a protective glass of the lidar sensors), which can have more or less pronounced effects depending on a degree of reflection of objects in the surroundings.

German Patent Application No. DE 10 2015 101 902 A1 describes a detector for a lidar system having a series of radiation-sensitive pixels arranged side by side. Intermediate areas, which are insensitive to radiation on account of their construction, are located between the pixels in order to reduce a crosstalk between the pixels.

European Patent No. EP 2 998 700 B1 describes an electro-optical distance measuring device and a distance measurement method. According to one specific embodiment, a transmit light beam and a receive light beam of the electro-optical distance measuring device are arranged biaxially with respect to each other. Due to the fact that a separate signal processing path is assignable to each receive segment, it is possible at least to reduce an electronic crosstalk of signals of different receive segments.

SUMMARY

According to a first aspect of the present invention, a method for ascertaining an optical crosstalk of a lidar sensor, in particular of a spatially resolving lidar sensor, is provided. The lidar sensor is designed for example as a point scanner, a flash lidar sensor and preferably as a line scanner. Preferably, the lidar sensor is furthermore a lidar sensor of a means of transportation (i.e., a transportation device), which is used for scanning a surroundings of the means of transportation. According to an example embodiment of the present invention, in a first step of the method according to the present invention, a laser light of the lidar sensor is emitted into a surroundings of the lidar sensor. In a second step of the method according to the present invention, a signal of a light detector of the lidar sensor representing components of the emitted laser light, which were reflected or scattered in the surrounding of the lidar sensor, are received. The light detector is preferably designed as a flat panel detector without being limited to such a design. The light detector additionally has a first receive region, the extension and position of which on the light detector corresponds to an extension and position of the laser light imaged on the light detector when a scattering of the laser light is equal to or less than a predefined threshold value. The light detector furthermore has a second receive region differing from the first receive region, which directly adjoins the first receive region and which is designed to detect components of the laser light imaged onto the light detector when the scattering of the laser light is greater than the predefined threshold value. Such a scattering of the laser light may be caused for example by a protective glass of the lidar sensor and/or by further optical elements (e.g., lenses) in the transmit and/or receive path. Further causes for such a scattering are for example rain drops and/or dirt on a protective glass of the lidar sensor. A respective extent of the scattering of the laser light in the region of the light detector furthermore depends on a degree of reflection of objects in the surroundings of the lidar sensor. In particular highly reflective objects such as retroreflectors (e.g., of traffic signs, traffic guidance devices, etc.) may thus result in a high degree of scattering of the laser light on the light detector. It should be noted that the method according to the present invention is based on the assumption that the scattered laser light received on the light detector corresponds essentially to an isotropic scattered light, that is, a scattered light, which is scattered uniformly in all directions. In a third step of the method according to the present invention, an extent of the optical crosstalk of the lidar sensor is ascertained on the basis of the components of the laser light received in the second receive region. At least the steps of receiving the signal and of ascertaining the information about the extent of the optical crosstalk occur by way of an evaluation unit according to the present invention. In accordance with the method described above, it is consequently possible to implement a particularly simple and cost-effective option for ascertaining an optical crosstalk of the lidar sensor.

Preferred developments of the present invention are disclosed herein.

The information about the extent of the optical crosstalk is preferably taken into account in detecting the surroundings on the basis of the signal of the lidar sensor and in particular on the basis of the signal components that represent the first receive region. In other words, on the basis of the method of the present invention, it is possible to evaluate a reliability of the detection of the surroundings, since in case of a great extent of scattering it must be assumed that erroneous detections of objects in the surroundings of the lidar sensor may potentially occur.

In an advantageous development of the present invention, components of the signal, which represent the second receive region, are used for the at least partial compensation of the crosstalk in the first receive region. This offers an advantage that a reliability of a result of a subsequent processing of the signal (e.g., in the surroundings detection described above) may be improved, since it is possible to eliminate at least partially interferences that entered the useful signal due to the scattering. While the ascertainment of the information about an extent of the optical crosstalk of the lidar sensor is fundamentally feasible in connection with any lidar system (point scanner, line scanner, flash lidar) of the aforementioned lidar sensors, a compensation of the crosstalk is normally advantageously applicable primarily in connection with line scanners. It shall explicitly not be precluded, however, that such a compensation is also performed in connection with other lidar systems on the basis of the method according to the present invention.

According to an example embodiment of the present invention, the lidar sensor is particularly preferably developed as a spatially resolving line scanner. In other words, the lidar scanner is designed to emit the laser light in a linear manner into a surroundings of the lidar sensor and spatially to resolve echoes, produced in the surroundings, of such a scanning line along an extension direction of the scanning line in the receive path of the lidar sensor. The first receive region comprises in connection with such a line scanner at least one pixel row, which is oriented in the direction of an image of the scanning line of the lidar sensor on the light detector. In order to compensate at least partially for the crosstalk in the first receive region, for each pixel to be considered of the at least one pixel row of the first receive region, a number of pixels of the second receive region, which adjoin the respective pixel to be considered, is ascertained, which is situated on an imaginary line that runs orthogonally with respect to the pixel row of the first receive region and which intersects the pixel to be considered. Subsequently, respective brightness values of the respective ascertained pixels of the second receive region are subtracted from respective brightness values of the pixel row of the first receive region in such a way that respective brightness values of those pixels are subtracted from one another, which have the same distance from the considered pixel. The compensation described above is preferably performed in such a way that for all pixels or a suitable subset of pixels of the pixel row of the first receive region (that is, the pixels respectively to be considered), the above processing steps are successively run through, respective results of preceding compensation steps serving as the basis of calculation for respectively subsequent compensation steps. Following the conclusion of all compensation runs, preferably, those components of the signal of the light detector in the signal, which represent the first receive region, are replaced by the respectively compensated brightness values. Alternatively or additionally, it is possible to produce a new signal on the basis of the compensated brightness values, which is subsequently supplied to downstream processing. In a particularly simple and therefore cost-effective development of a light detector usable in this connection, the light detector has an individual pixel row in the first receive region and a further pixel row situated in parallel to this pixel row, which represents the second receive region. In the event that a scattering in the pixel row of the second receive region exceeds the predefined threshold value, it is possible in this manner to compensate at least the directly adjacent pixels (e.g. above and/or below) the pixel respectively to be considered in the first region using the brightness value prevailing in the second region. By using a plurality of further parallel pixel rows in the second area, it is possible to compensate corresponding additional pixels in the first receive region situated further away from the pixel respectively to the considered using the additional detected brightness values in the second receive region.

Advantageously, brightness values of the second receive region, which are to be used for the respective compensation in the first receive region, are at least partially extrapolated using a predefined scattering characteristic of the lidar sensor. This may be used advantageously in particular when the second receive region, as described above by way of example, has only one row of pixels or a small number of parallel pixel rows. In such a case, it is possible, for example when using a single pixel row in the second receive region, to calculate for a current compensation run, on the basis of the brightness value of the individual pixel to be used in the second region, further brightness values along a virtual (since not really existing) pixel row in the second receive region. For this purpose, it is possible to use for example a function describing the scattering characteristic of the lidar sensor and/or a lookup table, by which it is possible to extrapolate further brightness values by inserting or adjusting the brightness value of the pixel of the second region. Furthermore, it is also possible to perform the extrapolation on the basis of a plurality of pixels in the second region, if the latter has more than one pixel in width. The scattering characteristic may be for example an average scattering characteristic for a plurality of similarly or identically constructed lidar sensors or a scattering characteristic ascertained individually for each lidar sensor.

Furthermore, it is possible that the first receive region comprises a plurality of parallel pixel rows, a representative pixel row being ascertained from the plurality of parallel pixel rows, to which the steps for compensation of the crosstalk is applied. The representative pixel row may be defined for example on the basis of average values of parallel pixels or on the basis of maximum brightness values in the parallel pixel rows.

In one advantageous development of the present invention, the compensation of the crosstalk is applied only to those pixels of the at least one pixel row, which exhibit a predefined minimum scattering in their respectively corresponding pixels in the second receive region. The predefined minimum scattering may be ascertained for example on the basis of a minimum brightness of a pixel of the second receive region corresponding to the considered pixel of the first receive region and/or on the basis of an average minimum brightness of a plurality of pixels in the corresponding second receive region and/or on the basis of a minimum number of illuminated pixels in the respectively corresponding second receive region.

A surface of the light detector is preferably essentially square, so that in the event of a maximum scattering of the scanning line imaged on the light detector, an optimal or approximately complete compensation of the brightness values of the first pixel rows is made possible.

Advantageously, the information about the extent of the optical crosstalk is used to ascertain a soiling and/or a wetness on a protective glass of the lidar sensor. Alternatively or additionally, the information about the extent of the optical crosstalk is used to ascertain a highly reflective object (e.g., a retroreflector) in the surroundings of the lidar sensor, whose degree of reflection exceeds a predefined degree of reflection.

Further advantageously, a position and/or extension of a highly reflective object in the surroundings of the lidar sensor is ascertained on the basis of a distribution of the scattering in the second receive region.

According to a second aspect of the present invention, a lidar sensor, in particular a spatially resolving lidar sensor is proposed. According to an example embodiment of the present invention, the lidar sensor comprises a evaluation unit, a light emitter and a light detector. The evaluation unit is developed for example as an ASIC, FPGA, processor, digital signal processor, microcontroller, or the like, and is connected in terms of information technology with the light detector, preferably additionally also with the light emitter. The lidar sensor is designed to emit a laser light by way of the light emitter into the surroundings of the lidar sensor, while the evaluation unit is designed to receive a signal of the light detector representing components of the laser light reflected or scattered in the surroundings of the lidar sensor. The light detector has a first receive region, the extension and position of which on the light detector corresponds to an extension and position of the laser light imaged on the light detector when a scattering of the laser light is equal to or less than a predefined threshold value. The light detector additionally has a second receive region differing from the first receive region, which directly adjoins the first receive region and which is designed to detect components of the laser light imaged onto the light detector when the scattering of the laser light is greater than the predefined threshold value. The evaluation unit is furthermore designed to ascertain information about an extent of the optical crosstalk of the lidar sensor on the basis of the components of the laser light received in the second receive region.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figures 1, 2:
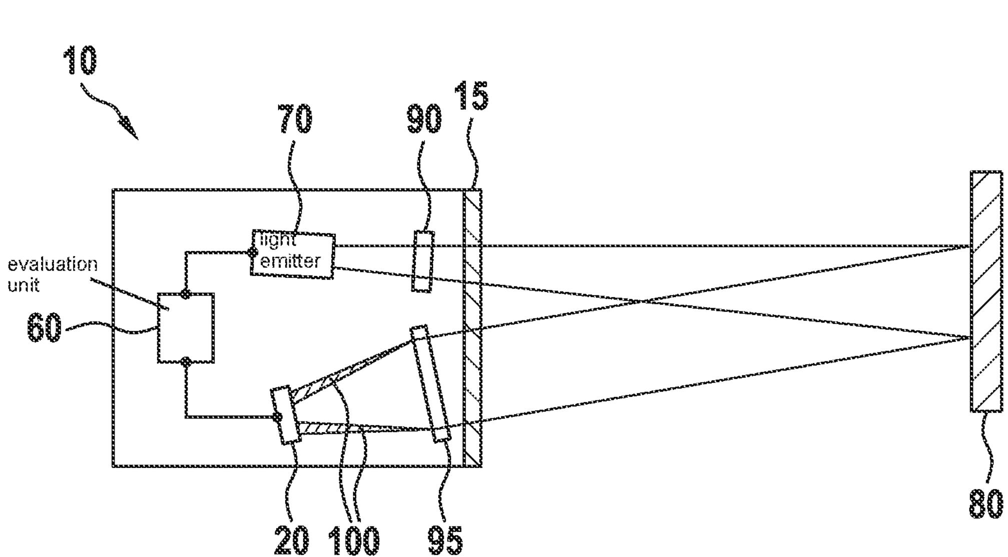
FIG. 1 shows a schematic overall view of components of a lidar sensor according to the present invention.
FIG. 2 shows a top view onto a light detector of a lidar sensor according to the present invention in a first receive state.

FIG. 1 shows a schematic overall view of components of a lidar sensor 10 according to the present invention. Lidar sensor 10 comprises a light emitter 70, which in combination with a transmitting optics 90 is designed to emit laser light in the form of a scanning line through a protective glass 15 of lidar sensor 10 into a surroundings of lidar sensor 10. Components of the emitted laser light reflected or scattered on an object 80 in the surroundings of lidar sensor 10 enter lidar sensor 10 again through the protective window 15 of lidar sensor 10 and are imaged by a receiving optics 95 of lidar sensor 10 onto a planar light detector 20 of lidar sensor 10. Due to a scattering property of the protective glass 15, the received laser light comprises, in particular the case of a high degree of reflection of object 80, scattered light components 100, which may result in a crosstalk and thus in a reduction of an accuracy of a spatial resolution of lidar sensor 10. An evaluation unit 60, which is here developed as an ASIC, is connected in terms of information technology with light emitter 70 and light detector 20. On the basis of a computer program executed by evaluation unit 60, which implements method steps of the present invention described above, evaluation unit 60 is designed to ascertain a respective extent of the crosstalk and moreover to perform an at least partial compensation of the crosstalk.

FIG. 2 shows a top view onto a light detector 20 of a lidar sensor according to the present invention in a first receive state. Light detector 20 is here developed as a square light detector 20, which has a first receive region 30 and a second receive region 35. Light detector 20 is designed to receive a scanning line imaged onto light detector 20 completely via the pixel row 40, which forms the first receive region 30, if a scattering of the imaged scanning line is equal to or smaller than a predefined threshold value. The second receive region 35 is composed of a plurality of pixels 55, which in the first receive state described here are not illuminated or are illuminated only negligibly due to a very low scattering of the scanning line.

Figure 3:
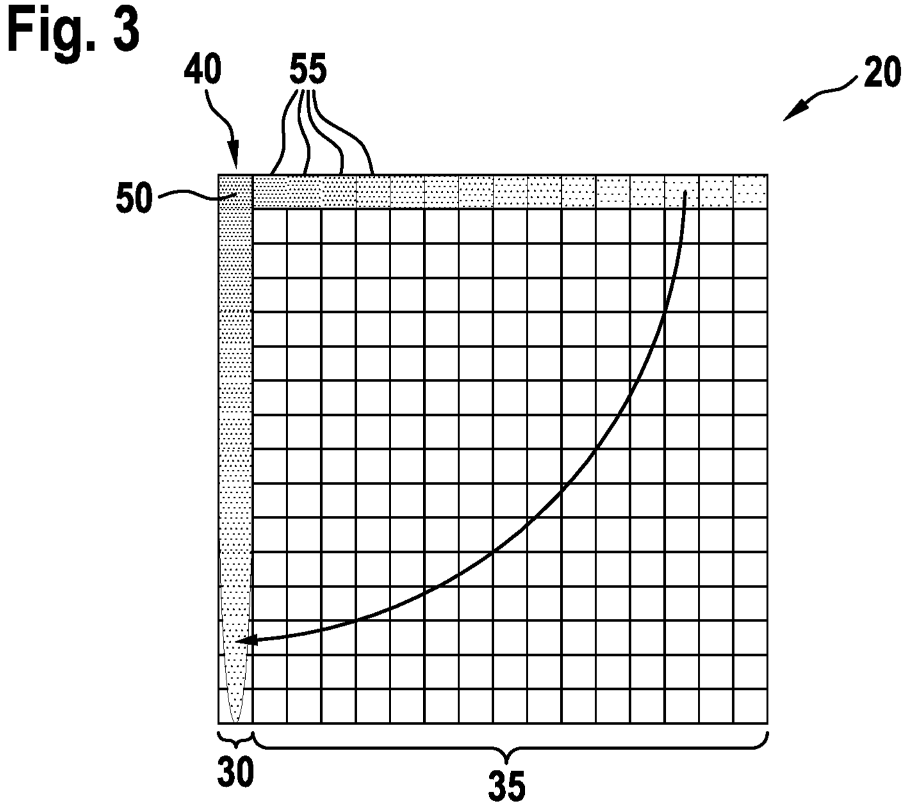
FIG. 3 shows a top view onto a light detector of a lidar sensor according to the present invention in a second receive state.

FIG. 3 shows a top view onto a light detector 20 of a lidar sensor according to the present invention in a second receive state. On account of the similarities between FIG. 2 and FIG. 3, only the differences between the two figures are described below in order to avoid repetition. FIG. 3 shows a second receive state, in which a portion of a scanning line imaged onto light detector 20 is scattered in the region of the uppermost left pixel of the first receive region 30 to such an extent that interference light components are detected in the second receive region 35. It should be pointed out that this is a simplified illustration, which does not show the actually radial scattering around the uppermost left pixel in the second receive region 35. Using the method of the present invention described above, the brightness information existing horizontally with respect to the upper left pixel in the second receive region 35 is algorithmically rotated quasi in the direction of pixel row 40 of the first receive region 30 (indicated by the illustrated arrow) and is subsequently subtracted respectively pixel by pixel from first receive region 30 in order to compensate the scattering of the scanning line.

The invention claimed is:

1. A method for ascertaining an optical crosstalk of a lidar sensor, comprising:

emitting a laser light of the lidar sensor into a surroundings of the lidar sensor, the laser sensor being a spatially resolving lidar sensor;

receiving a signal of a light detector of the lidar sensor representing components of the laser light reflected or scattered in the surroundings of the lidar sensor, wherein:

the light detector has a first receive region, an extension and position of which on the light detector corresponds to an extension and position of the laser light imaged onto the light detector when a scattering of the laser light is equal to or less than a predefined threshold value, and the light detector has a second receive region differing from the first receive region, which directly adjoins the first receive region and which is configured to detect components of the laser light imaged onto the light detector when the scattering of the laser light is greater than the predefined threshold value; and ascertaining information about an extent of the optical crosstalk of the lidar sensor based on the components of the laser light received in the second receive region.

2. The method as recited in claim 1, further comprising: taking into account the information about the extent of the optical crosstalk when detecting the surroundings on the basis of the signal of the lidar sensor.

3. The method as recited in claim 1, further comprising: using the components of the signal, which represent the second receive region, for the at least partial compensation of the crosstalk in the first receive region.

4. The method as recited in claim 3, wherein:

the lidar sensor is a spatially resolving line scanner, the first receive region includes at least one pixel row, which is oriented in a direction of an image of a scanning line of the lidar sensor on the light detector, and for the at least partial compensation of the crosstalk in the first receive region:

for each pixel to be considered of the at least one pixel row of the first receive region, a number of pixels of the second receive region, which adjoins the respective pixel to be considered, is ascertained, which is situated on an imaginary line that runs orthogonally with respect to the pixel row of the first receive region and which intersects the pixel to be considered, and respective brightness values of the respective ascertained pixels of the second receive region are subtracted from respective brightness values of the pixel row of the first receive region in such a way that respective brightness values of those pixels are subtracted from one another, which have the same distance from the considered pixel.

5. The method as recited in claim 4, wherein respective brightness values of the second receive region, which are to be used for the compensation in the first receive region, are at least partially extrapolated using a predefined scattering characteristic of the LiDAR sensor.

6. The method as recited in claim 4, wherein:

the first receive region includes a plurality of pixel rows arranged in parallel, a representative pixel row is ascertained from the plurality of parallel pixel rows, to which the steps for the compensation of the crosstalk are applied.

7. The method as recited in claim 4, wherein the compensation of the crosstalk is applied only to those pixels of the at least one pixel row, which exhibit a predefined minimum scattering in their respectively corresponding pixels in the second receive region.

8. The method as recited in claim 1, wherein the surface of the light detector is square.

9. The method as recited in claim 1, wherein the information about the extent of the optical crosstalk is used to ascertain:

(i) a soiling and/or a wetness on a protective glass of the lidar sensor, and/or (ii) a highly reflective object in the surroundings of the lidar sensor is used, a degree of reflection of which exceeds a predefined degree of reflection.

10. The method as recited in claim 9, wherein a position and/or extension of a highly reflective object is ascertained based on a distribution of the scattering in the second receive region.

11. A spatially resolving lidar sensor, comprising:

an evaluation unit;

a light emitter; and a light detector;

wherein the evaluation unit is configured to:

emit in combination with the light emitter a laser light into a surroundings of the lidar sensor, receive a signal of the light detector representing components of the laser light reflected or scattered in the surroundings of the lidar sensor, wherein the light detector has a first receive region, an extension and position of which on the light detector corresponds to an extension and position of the laser light imaged onto the light detector when a scattering of the laser light is equal to or less than a predefined threshold value, and the light detector has a second receive region differing from the first receive region, which directly adjoins the first receive region and which is configured to detect components of the laser light imaged onto the light detector when the scattering of the laser light is greater than the predefined threshold value, and ascertain information about an extent of the optical crosstalk of the lidar sensor based on the components of the laser light received in the second receive region.

* * * * *